United States Patent
Hällström et al.

(10) Patent No.: US 7,306,700 B1
(45) Date of Patent: Dec. 11, 2007

(54) PROCESS FOR THE PRODUCTION OF PAPER

(75) Inventors: Hans Hällström, Nacka (SE); Rein Sikkar, Floda (SE); Oliver Struck, Düren (DE)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/674,201

(22) PCT Filed: Apr. 26, 1999

(86) PCT No.: PCT/SE99/00678

§ 371 (c)(1),
(2), (4) Date: Dec. 6, 2000

(87) PCT Pub. No.: WO99/55962

PCT Pub. Date: Nov. 4, 1999

Related U.S. Application Data

(60) Provisional application No. 60/083,253, filed on Apr. 27, 1998.

(30) Foreign Application Priority Data

Apr. 27, 1998  (EP) .................................. 98850067

(51) Int. Cl.
D21H 17/45 (2006.01)
D21H 17/37 (2006.01)
C08F 220/56 (2006.01)
D12H 21/10 (2006.01)

(52) U.S. Cl. ................ 162/168.3; 162/158; 162/168.2; 526/307.2; 526/916; 526/923

(58) Field of Classification Search ............ 162/168.2, 162/168.3, 181.6, 181.8, 183, 157.1, 157.4, 162/157.5, 158, 164.1, 164.6, 179; 526/303.1, 526/304, 307, 307.2, 307.6, 307.7, 317.1, 526/916, 923, 939
See application file for complete search history.

(56) References Cited

U.S. PATENT DOCUMENTS

| | | | |
|---|---|---|---|
| 4,250,269 A | 2/1981 | Buckman et al. ............... 525/6 |
| 4,388,150 A | 6/1983 | Sunden et al. ............... 162/175 |
| 4,465,555 A * | 8/1984 | Linhart et al. ............ 162/168.2 |
| 4,702,844 A * | 10/1987 | Flesher et al. ............ 162/168.3 |
| 4,753,710 A | 6/1988 | Langley et al. .......... 162/164.3 |
| 4,795,531 A * | 1/1989 | Sofia et al. ............... 162/168.2 |
| 4,831,092 A * | 5/1989 | Bock et al. .................. 526/209 |
| 4,835,234 A * | 5/1989 | Valiant et al. ............... 526/258 |
| 4,894,119 A * | 1/1990 | Baron et al. ............. 162/168.3 |
| 4,913,775 A * | 4/1990 | Langley et al. ............. 162/183 |
| 4,927,498 A | 5/1990 | Rushmere ................ 162/168.3 |
| 4,940,763 A * | 7/1990 | Flesher et al. ............... 526/307 |
| 4,954,220 A | 9/1990 | Rushmere ................ 162/168.3 |
| 4,961,825 A | 10/1990 | Andersson et al. ......... 162/175 |
| 4,980,025 A | 12/1990 | Andersson et al. ...... 162/168.3 |
| 5,069,754 A * | 12/1991 | Watanabe et al. ........ 162/168.2 |
| 5,071,512 A | 12/1991 | Bixler et al. ................ 162/175 |
| 5,098,520 A | 3/1992 | Begala ..................... 162/168.1 |
| 5,127,994 A | 7/1992 | Johansson ................ 162/168.3 |
| 5,176,891 A | 1/1993 | Rushmere ................ 423/328.1 |
| 5,185,062 A | 2/1993 | Begala ..................... 162/168.1 |
| 5,277,764 A | 1/1994 | Johannson et al. ......... 162/175 |
| 5,368,833 A | 11/1994 | Johansson et al. .......... 423/338 |
| 5,432,245 A * | 7/1995 | Roberts et al. .......... 427/385.5 |
| 5,447,604 A | 9/1995 | Johansson et al. ....... 162/181.6 |
| 5,470,435 A | 11/1995 | Rushmere et al. ....... 162/181.6 |
| 5,514,249 A * | 5/1996 | Cauley et al. .............. 162/183 |
| 5,543,014 A | 8/1996 | Rushmere et al. ....... 162/181.6 |
| 5,571,494 A | 11/1996 | Saastamoinen ............. 423/338 |
| 5,573,674 A | 11/1996 | Lind et al. .................. 210/702 |
| 5,584,966 A | 12/1996 | Moffett .................... 162/168.1 |
| 5,603,805 A | 2/1997 | Andersson et al. ...... 162/168.3 |
| 5,607,552 A | 3/1997 | Andersson et al. ...... 162/181.6 |
| 5,647,956 A * | 7/1997 | Elliot et al. .............. 162/168.2 |
| 5,688,482 A | 11/1997 | Saastamoinen ............. 423/335 |
| 5,707,493 A | 1/1998 | Saastamoinen .......... 162/164.1 |
| 5,858,174 A | 1/1999 | Persson et al. .......... 162/164.1 |
| 5,876,563 A * | 3/1999 | Greenwood .............. 162/168.2 |
| 5,891,304 A * | 4/1999 | Wong Shing ............. 162/168.2 |
| 5,902,455 A * | 5/1999 | Hund et al. ............... 162/168.2 |
| 5,954,921 A * | 9/1999 | Dahmen et al. ......... 162/168.3 |
| 6,007,679 A * | 12/1999 | Nagarajan et al. ....... 162/168.3 |
| 6,059,930 A * | 5/2000 | Wong Shing et al. ... 162/168.2 |
| 6,071,379 A * | 6/2000 | Wong Shing et al. ... 162/168.2 |
| 6,103,065 A * | 8/2000 | Humphreys et al. ..... 162/168.3 |
| 6,238,520 B1 * | 5/2001 | Greenwood .............. 162/168.2 |
| 6,702,946 B1 | 3/2004 | Huang et al. ............... 210/723 |

FOREIGN PATENT DOCUMENTS

EP         0 335 575         10/1989

(Continued)

OTHER PUBLICATIONS

R. K. Iller and R. L. Dalton, Degree of Hydration of Particles of Colliodal Silica In Aqueous Solution, *J. Phys. Chem*, 60, (9156), 955-957.

(Continued)

Primary Examiner—Eric Hug
(74) *Attorney, Agent, or Firm*—Robert C. Morriss; David H. Vickrey; Michelle J. Burke

(57) ABSTRACT

The present invention relates to a process for the production of paper from a suspension containing cellulosic fibres, and optional fillers, comprising adding to the suspension drainage and retention aids comprising a cationic organic polymer and anionic microparticulate material, forming and dewatering the suspension on a wire, wherein the cationic organic polymer has a non-aromatic hydrophobic group. The invention further relates to a cationic vinyl addition polymer comprising in polymerized form at least one non-cationic monomer having a non-aromatic hydrophobic group and at least one cationic monomer.

15 Claims, No Drawings

FOREIGN PATENT DOCUMENTS

| | | |
|---|---|---|
| EP | 0 752 496 | 1/1997 |
| EP | 0 805 234 | 11/1997 |
| JP | 59-130397 | 7/1984 |
| JP | 63-92800 | 4/1988 |
| JP | 64-45899 | 2/1989 |
| JP | 4-185796 | 7/1992 |
| JP | 5-71099 | 3/1993 |
| JP | 5-263387 | 10/1993 |
| JP | 9-105098 | 4/1997 |
| JP | 10-46489 | 2/1998 |
| WO | WO95/02088 | 1/1995 |
| WO | WO95/02288 | 1/1995 |
| WO | WO97/18351 | 5/1997 |

OTHER PUBLICATIONS

George W. Sears, Jr., Determination of specific Surface Area of Colloidal Silica By Titration With Sodium Hydroxide, *Analytical Chem.*, 28 (1956), No. 12, pp. 1981-1983.

A. Thorp et al., Paper Machine Operations, Pulp and Paper Manufacture, *The Joint Textbooks Committee of the Paper Industry*, Atlanta, Third Ed. vol. 7, pp. 598-599; XP002109772.

English language translation of Laid-Open No. 63-92800 published Apr. 23, 1988.

Translation of JP 10-046489.

Translation of JP 05-263387.

Patent Abstracts of Japan abstracting JP 64-05899.

Translation of JP 05-071099.

English language translation of Laid-Open No. 1997-105098; Laid-open date Apr. 22, 1997.

English language translation of Laid-Open No. 1992-185796; Laid open date Jul. 2, 1992.

English language translation of Laid-Open No. 59-130397 published Jul. 26, 1984.

\* cited by examiner

PROCESS FOR THE PRODUCTION OF PAPER

The present application is the National Stage of PCT SE99/00678 filed Apr. 26, 1999, which claims priority of EP98850067.4 filed Apr. 27, 1998 and U.S. Provisional Patent Application Ser. No. 60/083,253 filed Apr. 27, 1998.

This invention relates to papermaking and more specifically to a process for the production of paper in which a cationic organic polymer having a hydrophobic group and an anionic microparticulate material are added to a papermaking stock. The process provides improved drainage and retention.

BACKGROUND OF THE INVENTION

In the papermaking art, an aqueous suspension containing cellulosic fibres, and optional fillers and additives, referred to as stock, is fed into a headbox which ejects the stock onto a forming wire. Water is drained from the stock through the forming wire so that a wet web of paper is formed on the wire, and the web is further dewatered and dried in the drying section of the paper machine. Water obtained by dewatering the stock, referred to as white water, which usually contains fine particles, e.g. fine fibres, fillers and additives, is usually recirculated in the papermaking process. Drainage and retention aids are conventionally introduced into the stock in order to facilitate drainage and increase adsorption of fine particles onto the cellulosic fibres so that they are retained with the fibres on the wire. Cationic organic polymers like cationic starch and cationic acrylamide-based polymers are widely used as drainage and retention aids. These polymers can be used alone but more frequently they are used in combination with other polymers and/or with anionic microparticulate materials such as, for example, anionic inorganic particles like colloidal silica and bentonite.

U.S. Pat. Nos. 4,980,025; 5,368,833; 5,603,805; 5,607,552; and 5,858,174; as well as International Patent Application No. WO 97/18351 disclose the use of cationic and amphoteric acrylamide-based polymers and anionic inorganic particles as stock additives in papermaking. These additives are among the most efficient drainage and retention aids now in use. Similar systems are disclosed in European Patent Application No. 805,234.

SUMMARY OF THE INVENTION

According to the present invention it has been found that improved drainage and retention can be obtained by using drainage and retention aids comprising a cationic organic polymer having a hydrophobic group and an anionic microparticulate material. More specifically, the present invention relates to a process for the production of paper from a suspension containing cellulosic fibres, and optional fillers, which comprises adding to the suspension a cationic organic polymer and an anionic microparticulate material, forming and dewatering the suspension on a wire, wherein the cationic organic polymer has a non-aromatic hydrophobic group. In a preferred aspect of the invention, the process further comprises forming and dewatering the suspension on a wire to obtain a wet web containing cellulosic fibres, or paper, and white water, recirculating the white water and optionally introducing fresh water to form a suspension containing cellulosic fibres, and optional fillers, to be dewatered to form paper, wherein the amount of fresh water introduced is less than 30 tons per ton of dry paper produced.

The invention thus relates to a process as further defined in the claims.

DETAILED DESCRIPTION OF THE INVENTION

The process of this invention results in improved drainage and/or retention and hereby the present process makes it possible to increase the speed of the paper machine and to use a lower dosage of additives to give a corresponding drainage and retention effect, thereby leading to an improved papermaking process and economic benefits. The process of this invention is suitably used for the treatment of cellulosic suspensions in closed mills wherein the white water is repeatedly recycled with the introduction of only low amounts of fresh water. The process is further suitably applied to papermaking processes using cellulosic suspensions having high salt contents, and thus having high conductivity levels, for example processes with extensive white water recycling and limited fresh water supply and/or processes using fresh water having high salt contents.

The cationic organic polymer having a hydrophobic group according to this invention, herein also referred to as "main polymer", can be linear, branched or cross-linked, e.g. in the form of a microparticulate material, preferably essentially linear. Preferably the main polymer is water-soluble or water-dispersable. The hydrophobic group of the main polymer is non-aromatic and it can be a pendent group attached to the polymer backbone (main chain) or, preferably, a hydrophobic group attached to a heteroatom, e.g. nitrogen or oxygen, the nitrogen optionally being charged, which heteroatom, in turn, can be attached to the polymer backbone, for example via a chain of atoms. The hydrophobic group has at least 2 and usually at least 3 carbon atoms, suitably from 3 to 12 and preferably from 4 to 8 carbon atoms. The hydrophobic group is suitably a hydrocarbon chain. Examples of suitable hydrophobic groups include linear, branched and cyclic alkyl groups like ethyl; propyl, e.g. n-propyl and iso-propyl; butyl, e.g. n-butyl, iso-butyl and t-butyl; pentyl, e.g. n-pentyl, neo-penyl and iso-pentyl; hexyl, e.g. n-hexyl and cyclohexyl; heptyl, e.g. n-heptyl and cycloheptyl, octyl, e.g. n-octyl; nonyl, e.g. n-nonyl; decyl, e.g. n-decyl; undecyl, e.g. n-undecyl and dodecyl, e.g. n-dodecyl. The linear and branched chain alkyl groups are generally preferred.

The main polymer can be selected from homopolymers and copolymers prepared from one or more monomers comprising at least one monomer having a hydrophobic group, suitably an ethylenically unsaturated monomer, and the main polymer is preferably a vinyl addition polymer. The term "vinyl addition polymer", as used herein, refers to a polymer prepared by addition polymerization of vinyl monomers or ethylenically unsaturated monomers which include, for example, acrylamide-based and acrylate-based monomers. According to a first embodiment of this invention, suitable main polymers include cationic vinyl addition polymers obtained by polymerizing a cationic monomer having a non-aromatic hydrophobic group or a monomer mixture comprising such a monomer. Preferably the cationic monomer having a non-aromatic hydrophobic group is represented by the general formula (I):

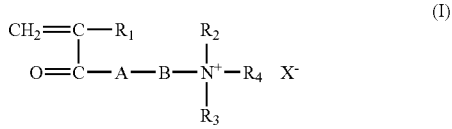

wherein $R_1$ is H or $CH_3$; $R_2$ and $R_3$ are each H or, preferably, an alkyl group having from 1 to 3 carbon atoms, suitably 1 to 2 carbon atoms; A is O or NH; B is an alkylene group of from 2 to 8 carbon atoms, suitably 2 to 4 carbon atoms, or a hydroxy propylene group; $R_4$ is a substituent containing a hydrophobic group, suitably a non-aromatic hydrocarbon group containing at least 2 carbon atoms, suitably from 3 to 12 and preferably from 4 to 8 carbon atoms; and $X^-$ is an anionic counterion, usually a halide like chloride. The group $R_4$ usually comprises and, preferably, is selected from any of the linear, branched or cyclic alkyl groups mentioned above and the total number of carbon atoms of the groups $R_2$, $R_3$ and $R_4$ is usually at least 4, suitably at least 5 and preferably at least 6. Examples of suitable cationic monomers having a non-aromatic hydrophobic group include (meth)-acryloxy-ethyl-N,N-dimethyl-N-n-butylammonium chloride, (meth)acryloxyaminoethyl-N,N-dimethyl-N-n-butylammonium chloride, (meth)acryloxypropyl-N,N-dimethyl-N-t-butyl-ammonium chloride, (meth)acryloxyaminopropyl-N,N-dimethyl-N-t-butylammonium chloride, (meth)acryloxyamino-propyl-N,N-dimethyl-N-n-hexylammonium chloride, (meth)-acryloxyethyl-N,N-dimethyl-N-n-hexylammonium chloride, (meth)acryloxyethyl-N,N-dimethyl-N-methylcyclohexylammonium chloride, and (meth)acryloxyaminopropyl-N,N-dimethyl-N-methylcyclohexylammonium chloride.

The main polymer can be a homopolymer prepared from a cationic monomer having a non-aromatic hydrophobic group or a copolymer prepared from a monomer mixture comprising a cationic monomer having a non-aromatic hydrophobic group and one or more copolymerizable monomers. Suitable copolymerizable non-ionic monomers include monomers represented by the general formula (II):

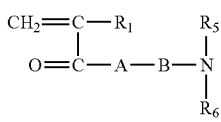

wherein $R_1$ is H or $CH_3$; A is O or NH; B is an alkylene group of from 2 to 8 carbon atoms, suitably 2 to 4 carbon atoms, or a hydroxy propylene group or, alternatively, A and B are both nothing whereby there is a single bond between C and N(O=C—$NR_5R_6$); $R_5$ and $R_6$ are each H or a substituent containing a hydrophobic group, suitably a hydrocarbon group, preferably alkyl, having from 1 to 6, suitably from 1 to 4 and usually from 1 to 3 carbon atoms. Examples of suitable copolymerizable monomers of this type include (meth)-acrylamide; acrylamide-based monomers like N-alkyl(meth)acrylamides and N,N-dialkyl (meth)acrylamides, e.g. N-n-propylacrylamide, N-isopropyl(meth)acrylamide, N-n-butyl (meth)acrylamide, N-isobutyl(meth)acrylamide and N-t-butyl(meth)acrylamide; and dialkyl-aminoalkyl (meth)acrylamides, e.g. dimethylaminoethyl (meth)acrylamide, diethyl-aminoethyl (meth)acrylamide, dimethylaminopropyl(meth)acrylamide and diethylaminopropyl (meth)acrylamide; acrylate-based monomers like dialkylaminoalkyl(meth)acrylates, e.g. dimethylaminoethyl (meth)acrylate, diethylaminoethyl(meth)acrylate, t-butylaminoethyl (meth)acrylate and dimethylaminohydroxypropyl acrylate; and vinylamides, e.g. N-vinyl-formamide and N-vinylacetamide. Preferred copolymerizable non-ionic monomers include acrylamide and methacrylamide, i.e. (meth)acrylamide, and the main polymer is preferably an acrylamide-based polymer.

Suitable copolymerizable cationic monomers include the monomers represented by the general formula (III):

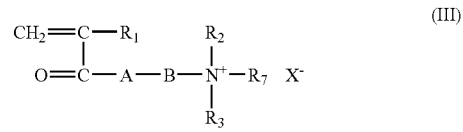

wherein $R_1$ is H or $CH_3$; $R_2$ and $R_3$ are each H or, preferably, an alkyl group having from 1 to 3 carbon atoms, suitably 1 to 2 carbon atoms; A is O or NH; B is an alkylene group of from 2 to 8 carbon atoms, suitably 2 to 4 carbon atoms, or a hydroxy propylene group; $R_7$ is H, a hydrocarbon group, suitably alkyl, having from 1 to 3 carbon atoms, suitably 1 to 2 carbon atoms, or a substituent containing an aromatic group, suitably a phenyl or substituted phenyl group, which can be attached to the nitrogen by means of an alkylene group usually having from 1 to 3 carbon atoms, suitably 1 to 2 carbon atoms, for example a benzyl group (—$CH_2$—$C_6H_5$) or a phenylethyl group (—$CH_2$—$CH_2$—$C_6H_5$); and $X^-$ is an anionic counterion, usually methylsulphate or a halide like chloride. Examples of suitable cationic copolymerizable monomers include acid addition salts and quaternary ammonium salts of the dialkylaminoalkyl(meth)acrylamides and dialkylaminoalkyl(meth)acrylates mentioned above, usually prepared using acids like HCl, $H_2SO_4$, etc., or quaternizing agents like methyl chloride, dimethyl sulphate, benzyl chloride, etc.; and diallyldialkylammonium halides like diallyldimethylammonium chloride. Copolymerizable anionic monomers like acrylic acid, methacrylic acid, various sulfonated vinyl addition monomers, etc. can also be employed and, preferably, in minor amounts.

According to a second embodiment of this invention, suitable main polymers include cationic vinyl addition polymers obtained by polymerizing a monomer mixture comprising at least one non-cationic ethylenically unsaturated monomer having a non-aromatic hydrophobic group and at least one cationic ethylenically unsaturated monomer, the non-aromatic hydrophobic group being as defined above, and this invention further relates to a cationic vinyl addition polymer having a non-aromatic hydrophobic group, its preparation and use, as further defined in the claims. Suitable non-cationic monomers having a non-aromatic hydrophobic group include non-ionic monomers, preferably a non-ionic monomer represented by the general formula (IV):

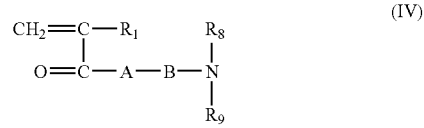

wherein $R_1$ is H or $CH_3$; A is O or NH; B is an alkylene group of from 2 to 8 carbon atoms, suitably 2 to 4 carbon atoms, or a hydroxy propylene group or, alternatively, A and B are both nothing whereby there is a single bond between C and N (O=C—$NR_8R_9$); $R_8$ and $R_9$ are each H or a substituent containing a hydrophobic group, suitably a hydrocarbon group, preferably alkyl, having from 1 to 6 carbon atoms, at least one of $R_8$ and $R_9$ being a substituent containing a hydrophobic group, suitably an alkyl group, having from 2 to 6 and preferably 3 to 4 carbon atoms. The total number of carbon atoms of the groups $R_8$ and $R_9$ is usually at least 2, suitably at least 3 and notably from 3 to 6. Examples of suitable copolymerizable monomers of this type include acrylamide-based monomers like N-alkyl (meth)acrylamides, e.g. N-ethyl(meth)acrylamide, N-n-propyl(meth)acrylamide, N-iso-propyl (meth)acrylamide, N-n-butyl(meth)acrylamide, N-t-butyl(meth)acrylamide, N-iso-butyl (meth)acrylamide, N-n-butoxymethyl(meth) acrylamide, and N-isobutoxymethyl (meth)acrylamide; N-alkylaminoalkyl(meth)acrylamides; N,N-dialkylaminoalkyl(meth)acryl-amides, as well as acrylate-based monomers like N-alkylaminoalkyl(meth)acrylates and N,N-dialkylaminoalkyl(meth)acrylates, e.g. t-butylamino-2-ethyl (meth)acrylate.

Further suitable non-cationic monomers having a non-aromatic hydrophobic group include non-ionic monomers represented by the general formula (V):

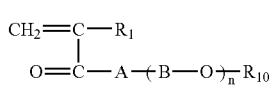

(V)

wherein $R_1$ is H or $CH_3$; A is O or NH; B is an alkylene group of from 2 to 4 carbon atoms, suitably 2 to 3 carbon atoms, preferably ethylene (—$CH_2$—$CH_2$—) or propylene (—$CH_2$—$CH(CH_3)$— or —$CH(CH_3)$—$CH_2$—); n is an integer of at least 1, suitably from 2 to 40 and preferably 3 to 20; $R_{10}$ is a substituent containing a hydrophobic group, suitably alkyl, having at least 2 carbon atoms, suitably from 3 to 12 and preferably from 4 to 8 carbon atoms. Examples of suitable copolymerizable monomers of this type include alkyl(mono-, di- and polyethyleneglycol) (meth)acrylates and alkyl(mono-, di- and polypropyleneglycol) (meth)acrylates, e.g. ethyltriglycol (meth)acrylate and butyldiglycol (meth)acrylate.

The cationic monomer can be selected from any of the cationic monomers mentioned above, including the cationic monomers represented by the general formulae (I) and (III) as well as diallyldialkylammonium halides like diallyldimethylammonium chloride. The monomer mixture according to the second embodiment may also comprise other copolymerizable monomers such as, for example, the non-ionic monomers represented by the general formula (II) above which may not have a hydrophobic group, suitably acrylamide and methacrylamide, and the anionic monomers mentioned above.

Main polymers according to this invention can be prepared from a monomer mixture generally comprising from 1 to 99 mole %, suitably from 2 to 50 mole % and preferably from 5 to 25 mole % of monomer having a non-aromatic hydrophobic group, and from 99 to 1 mole %, suitably from 98 to 50 mole % and preferably from 95 to 75 mole % of other copolymerizable monomers which preferably comprises acrylamide or methacryl-amide ((meth)acrylamide), the monomer mixture suitably comprising from 98 to 50 mole % and preferably from 95 to 75 mole % of (meth)acrylamide, the sum of percentages being 100. According to the first embodiment of this invention, the monomer having a non-aromatic hydrophobic group is cationic. According to the second embodiment of this invention, the monomer having a non-aromatic hydrophobic group is non-cationic and the monomer mixture thus also comprises a copolymerizable cationic monomer which suitably is present in an amount of from 2 to 50 mole % and preferably from 5 to 25 mole %.

The main polymer according to this invention can be prepared by polymerization of monomers in known manner and the polymerization is suitably carried out in an aqueous or inverse emulsion phase. The monomer(s) used, including the monomer having a hydrophobic group described above, are preferably at least in part soluble in the aqueous phase. Polymerization processes are generally known in the art and reference is made to Encyclopedia of Polymer Science and Engineering, Vol. 1–18, John Wiley & Sons, 1985, which is hereby incorporated herein by reference. The polymerization is suitably initiated in an aqueous phase containing monomers, a conventional free-radical polymerization initiator and optionally chain-transfer agent for modifying the molecular weight of the polymer, and is suitably carried out in the absence of oxygen in an inert gas atmosphere, for example under nitrogen. The polymerization suitably takes place under stirring at temperatures between 20 and 100° C., preferably between 40 and 90° C.

Usually the charge density of the main polymer is from 0.2 to 5.0 meqv/g of dry polymer, suitably from 0.6 to 3.0. The weight average molecular weight of synthetic main polymers is usually at least about 500,000, suitably above about 1,000,000 and preferably above about 2,000,000. The upper limit is not critical; it can be about 30,000,000, usually 25,000,000 and suitably 20,000,000.

The main polymer of this invention may be in any state of aggregation such as, for example, in solid form, e.g. powders, in liquid form, e.g. solutions, emulsions, dispersions, including salt dispersions, etc. When being added to the stock, the main polymer is suitably in liquid form, e.g. in the form of an aqueous solution or dispersion.

The anionic microparticulate material according to this invention can be selected from inorganic and organic particles. Anionic inorganic particles that can be used according to the invention include anionic silica-based particles and clays of the smectite type. It is preferred that the anionic inorganic particles are in the colloidal range of particle size. Anionic silica-based particles, i.e. particles based on $SiO_2$ or silicic acid, are preferably used and such particles are usually supplied in the form of aqueous colloidal dispersions, so-called sols. Examples of suitable silica-based particles include colloidal silica and different types of polysilicic acid. The silica-based sols can also be modified and contain other elements, e.g. aluminium and/or boron, which can be present in the aqueous phase and/or in the silica-based particles. Suitable silica-based particles of this type include colloidal aluminium-modified silica and aluminium silicates. Mixtures of such suitable silica-based particles can also be used. Drainage and retention aids comprising suitable anionic silica-based particles are disclosed in U.S. Pat. Nos. 4,388,150; 4,927,498; 4,954,220; 4,961,825; 4,980,025; 5,127,994; 5,176,891; 5,368,833; 5,447,604; 5,470,435; 5,543,014; 5,571,494; 5,573,674; 5,584,966; 5,603,805; 5,688,482; and 5,707,493; which are hereby incorporated herein by reference.

Anionic silica-based particles suitably have an average particle size below about 50 nm, preferably below about 20 nm and more preferably in the range of from about 1 to about 10 nm. As conventional in silica chemistry, the particle size refers to the average size of the primary particles, which may be aggregated or non-aggregated. The specific surface area of the silica-based particles is suitably above 50 $m^2/g$ and preferably above 100 $m^2/g$. Generally, the specific surface area can be up to about 1700 $m^2/g$ and preferably up to 1000 $m^2/g$. The specific surface area can be measured by means of titration with NaOH in known manner, e.g. as described by Sears in Analytical Chemistry 28(1956):12, 1981–1983 and in U.S. Pat. No. 5,176,891. The given area thus represents the average specific surface area of the particles.

In a preferred embodiment of the invention, the anionic inorganic particles are silica-based particles having a specific surface area within the range of from 50 to 1000 $m^2/g$, preferably from 100 to 950 $m^2/g$. Sols of silica-based particles these types also encompass modified sols like aluminium-containing silica-based sols and boron-containing silica-based sols. Preferably, the silica-based particles are present in a sol having an S-value in the range of from 8 to 45%, preferably from 10 to 30%, containing silica-based particles with a specific surface area in the range of from 300 to 1000 $m^2/g$, suitably from 500 to 950 $m^2/g$, and preferably from 750 to 950 $m^2/g$, which sols can be modified with aluminium and/or boron as mentioned above. For example, the particles can be surface-modified with aluminium to a degree of from 2 to 25% substitution of silicon atoms. The S-value can be measured and calculated as described by Iler & Dalton in J. Phys. Chem. 60(1956), 955–957. The S-value indicates the degree of aggregate or microgel formation and a lower S-value is indicative of a higher degree of aggregation.

In yet another preferred embodiment of the invention, the silica-based particles are selected from polysilicic acid and modified polysilicic acid having a high specific surface area, suitably above about 1000 $m^2/g$. The specific surface area can be within the range of from 1000 to 1700 $m^2/g$ and preferably from 1050 to 1600 $m^2/g$. The sols of modified polysilicic acid can contain other elements, e.g. aluminium and/or boron, which can be present in the aqueous phase and/or in the silica-based particles. In the art, polysilicic acid is also referred to as polymeric silicic acid, polysilicic acid microgel, polysilicate and polysilicate microgel, which are all encompassed by the term polysilicic acid used herein. Aluminium-containing compounds of this type are commonly also referred to as poly-aluminosilicate and polyaluminosilicate microgel, which are both encompassed by the terms colloidal aluminium-modified silica and aluminium silicate used herein.

Clays of the smectite type that can be used in the process of the invention are known in the art and include naturally occurring, synthetic and chemically treated materials. Examples of suitable smectite clays include montmorillonite/bentonite, hectorite, beidelite, nontronite and saponite, preferably bentonite and especially such bentonite which after swelling preferably has a surface area of from 400 to 800 $m^2/g$. Suitable clays are disclosed in U.S. Pat. Nos. 4,753,710; 5,071,512; and 5,607,552, which are hereby incorporated herein by reference.

Anionic organic particles that can be used according to the invention include highly cross-linked anionic vinyl addition polymers, suitably copolymers comprising an anionic monomer like acrylic acid, methacrylic acid and sulfonated or phosphonated vinyl addition monomers, usually copolymerized with nonionic monomers like (meth)acrylamide, alkyl (meth)acrylates, etc. Useful anionic organic particles also include anionic condensation polymers, e.g. melamine-sulfonic acid sols.

In addition to the cationic organic polymer having a hydrophobic group and the anionic microparticulate material, the drainage and retention aids (agents) according to the present invention may also comprise further components such as, for example, low molecular weight cationic organic polymers and/or aluminium compounds. The term "drainage and retention aids", as used herein, refers to two or more components (aids, agents or additives) which, when being added to a stock, give better drainage and/or retention than is obtained when not adding the components.

Low molecular weight (hereinafter LMW) cationic organic polymers that can be used include those commonly referred to and used as anionic trash catchers (ATC). ATC's are known in the art as neutralizing and/or fixing agents for detrimental anionic substances present in the stock and the use thereof in combination with drainage and retention aids often provide further improved drainage and/or retention. The LMW cationic organic polymer can be derived from natural or synthetic sources, and preferably it is an LMW synthetic polymer. Suitable organic polymers of this type include LMW highly charged cationic organic polymers such as polyamines, polyamidoamines, polyethyleneimines, homo- and copolymers based on diallyldimethyl ammonium chloride, (meth)acrylamides and (meth)acrylates. In relation to the molecular weight of the main polymer, the molecular weight of the LMW cationic organic polymer is usually lower; it is suitably at least 2,000 and preferably at least 10,000. The upper limit of the molecular weight is usually about 700,000, suitably about 500,000 and preferably about 200,000.

Aluminium compounds that can be used according to this invention include alum, aluminates, aluminium chloride, aluminium nitrate and polyaluminium compounds, such as polyaluminium chlorides, polyaluminium sulphates, polyaluminium compounds containing both chloride and sulphate ions, polyaluminium silicate-sulphates, and mixtures thereof. The polyaluminium compounds may also contain other anions than chloride ions, for example anions from sulfuric acid, phosphoric acid, organic acids such as citric acid and oxalic acid.

The components of drainage and retention aids according to the invention can be added to the stock in conventional manner and in any order. It is preferred to add the main polymer to the stock before adding the anionic microparticulate material, even if the opposite order of addition may be used. It is further preferred to add the main polymer before a shear stage, which can be selected from pumping, mixing, cleaning, etc., and to add the anionic particles after that shear stage. When using an LMW cationic organic polymer and/or an aluminium compound, such components are preferably introduced into the stock prior to introducing the main polymer and anionic microparticulate material. Alternatively, the LMW cationic organic polymer and the main polymer can be introduced into the stock essentially simultaneously, either separately or in admixture, e.g. as disclosed in U.S. Pat. No. 5,858,174, which is hereby incorporated herein by reference.

The components of the present drainage and retention aids are added into the stock to be dewatered in amounts which can vary within wide limits depending on, inter alia, type and number of components, type of furnish, filler content, type of filler, point of addition, salt content, etc. Generally the components are added in an amount that give better drainage and/or retention than is obtained when not adding the components. The main polymer is usually added in an amount of at least 0.001%, often at least 0.005% by weight, based on dry stock substance, and the upper limit is usually 3% and suitably 1.5% by weight. The anionic microparticulate material is usually added in an amount of at least 0.001% by weight, often at least 0.005% by weight, based on dry substance of the stock, and the upper limit is usually 1.0% and suitably 0.6% by weight. When using anionic silica-based particles, the total amount added is suitably within the range of from 0.005 to 0.5% by weight, calculated as $SiO_2$ and based on dry stock substance, preferably within the range of from 0.01 to 0.2% by weight. When using an LMW cationic organic polymer in the process, it can be added in an amount of at least 0.05%, based on dry substance of the stock to be dewatered. Suitably, the amount is in the range of from 0.07 to 0.5%, preferably in the range from 0.1 to 0.35%. When using an aluminium compound in the process, the total amount introduced into the stock to be dewatered is dependent on the type of aluminium compound used and on other effects desired from it. It is for instance well known in the art to utilise aluminium compounds as precipitants for rosin-based sizing agents. The total amount added is usually at least 0.05%, calculated as $Al_2O_3$ and based on dry stock substance. Suitably the amount is in the range of from 0.5 to 3.0%, preferably in the range from 0.1 to 2.0%.

The process of the invention is preferably used in the manufacture of paper from a suspension containing cellulosic fibres, and optional fillers, having a high conductivity. Usually, the conductivity of the stock that is dewatered on the wire is at least 0.75 mS/cm, suitably at least 2.0 mS/cm, preferably at least 3.5 mS/cm. Very good results have been observed at conductivity levels above 5.0 mS/cm and even above 7.5 mS/cm. Conductivity can be measured by standard equipment such as, for example a WTW LF 539 instrument supplied by Christian Berner. The values referred to above are suitably determined by measuring the conductivity of the cellulosic suspension that is fed into or present in the headbox of the paper machine or, alternatively, by measuring the conductivity of white water obtained by dewatering the suspension. High conductivity levels mean high contents of salts (electrolytes), where the various salts can be based on mono-, di- and multivalent cations like alkali metals, e.g. $Na^+$ and $K^+$, alkaline earths, e.g. $Ca^{2+}$ and $Mg^{2+}$, aluminium ions, e.g. $Al^{3+}$, $Al(OH)^{2+}$ and polyaluminium ions, and mono-, di- and multivalent anions like halides, e.g., $Cl^-$, sulfates, e.g. $SO_4^{2-}$ and $HSO_4^-$, carbonates, e.g. $CO_3^{2-}$ and $HCO_3^-$, silicates and lower organic acids. The invention is particularly useful in the manufacture of paper from stocks having high contents of salts of di- and multivalent cations, and usually this content is at least 200 ppm, suitably at least 300 ppm and preferably at least 400 ppm. The salts can be derived from the cellulosic fibres and fillers used to form the stock, in particular in integrated mills where a concentrated aqueous fibre suspension from the pulp mill normally is mixed with water to form a dilute suspension suitable for paper manufacture in the paper mill. The salt may also be derived from various additives introduced into the stock, from the fresh water supplied to the process, or be added deliberately, etc. Further, the content of salts is usually higher in processes where white water is extensively recirculated, which may lead to considerable accumulation of salts in the water circulating in the process.

Accordingly, the invention is further suitably used in papermaking processes where white water is extensively recirculated (recycled), i.e. with a high degree of white water closure, for example where from 0 to 30 tons of fresh water are used per ton of dry paper produced, usually less than 20, suitably less than 15, preferably less than 10 and notably less than 5 tons of fresh water per ton of paper. Recirculation of white water obtained in the process suitably comprises mixing the white water with cellulosic fibres and/or optional fillers to form a suspension to be dewatered; preferably it comprises mixing the white water with a suspension containing cellulosic fibres, and optional fillers, before the suspension enters the forming wire for dewatering. The white water can be mixed with the suspension before, between or after introducing the drainage and retention aids. Fresh water can be introduced in the process at any stage; for example, it can be mixed with cellulosic fibres in order to form a suspension, and it can be mixed with a suspension containing cellulosic fibres to dilute it so as to form the suspension to be dewatered, before or after mixing the stock with white water and before, between or after introducing the drainage and retention aids.

Further additives which are conventional in papermaking can of course be used in combination with the additives according to the invention, such as, for example, dry strength agents, wet strength agents, sizing agents, e.g. those based on rosin, ketene dimers and acid anhydrides, optical brightening agents, dyes, etc. The cellulosic suspension, or stock, can also contain mineral fillers of conventional types such as, for example, kaolin, china clay, titanium dioxide, gypsum, talc and natural and synthetic calcium carbonates such as chalk, ground marble and precipitated calcium carbonate.

The process of this invention is used for the production of paper. The term "paper", as used herein, of course include not only paper and the production thereof, but also other sheet or web-like products, such as for example board and paperboard, and the production thereof. The process can be used in the production of paper from different types of suspensions of cellulose-containing fibres and the suspensions should suitably contain at least 25% by weight and preferably at least 50% by weight of such fibres, based on dry substance. The suspensions can be based on fibres from chemical pulp such as sulphate, sulphite and organosolv pulps, mechanical pulp such as thermomechanical pulp, chemo-thermomechanical pulp, refiner pulp and groundwood pulp, from both hardwood and soft-wood, and can also be based on recycled fibres, optionally from de-inked pulps, and mixtures thereof.

The invention is further illustrated in the following Examples which, however, are not intended to limit the same. Parts and % relate to parts by weight and % by weight, respectively, unless otherwise stated.

EXAMPLE 1

Cationic polymers were prepared by polymerizing a monomer mixture according to the following general procedure:

Monomers and an initiator, 2,2'-azobis(2-amidinopropane)dihydrochloride (Wako V-50) were added to an aqueous phase and polymerization was carried out for about 24 hours at 45° C. with stirring under a nitrogen atmosphere. The cationic polymer, which was obtained as a clear gel, was dissolved in water and used as an 0.1% aqueous solution.

Polymers according to the invention, P1 to P5, and polymers intended for comparison purposes, Ref. 1 and Ref. 2, were prepared from the indicated monomers in the indicated amounts:

P1: acrylamide (90 mole %), and acryloxyethyl dimethyl n-butylammonium chloride (10 mole %);
P2: acrylamide (90 mole %) and acryloxyethyl dimethyl methylcyclohexylammonium chloride (10 mole %);
P3: acrylamide (90 mole %), methacryloxyaminopropyl trimethylammonium chloride (5 mole %), and methacryloxyethyl t-butylamine (5 mole %);
P4: acrylamide (90 mole %), methacryloxyaminopropyl-trimethylammonium chloride (5 mole %), and N-isopropylacrylamide (5 mole %);
P5: acrylamide (90 mole %), methacryloxyaminopropyl-trimethylammonium chloride (5 mole %), and N-t-butylacrylamide (5 mole %);
Ref. 1: acrylamide (90 mole %), and acryloxyethyl trimethylammonium chloride (10 mole %).
Ref. 2: acrylamide (95 mole %), and acryloxyethyl trimethylammonium chloride (5 mole %).

EXAMPLE 2

Drainage and retention performance was evaluated by means of a Dynamic Drainage Analyser (DDA), available from Akribi, Sweden, which measures the time for draining a set volume of stock through a wire when removing a plug and applying vacuum to that side of the wire opposite to the side on which the stock is present. First pass retention was evaluated by measuring, with a nephelometer, the turbidity of the filtrate, the white water, obtained by draining the stock.

The furnish used was based on 56% by weight of peroxide bleached TMP/SGW pulp (80/20), 14% by weight of bleached birch/pine sulphate pulp (60/40) refined to 200° CSF and 30% by weight of china clay. To the stock was added 40 g/l of a colloidal fraction, bleach water from an SC mill, filtrated through a 5 μm screen and concentrated with an UF filter, cut off 200,000. Stock volume was 800 ml, consistency 0.14% and pH 7.0. Conductivity was adjusted to about 2.5 mS/cm by addition of calcium chloride (400 ppm Ca).

The stock was stirred in a baffled jar at a speed of 1500 rpm throughout the test and additions were conducted as follows: i) adding cationic polymer to the stock following by stirring for 30 seconds, ii) adding anionic microparticulate material to the stock followed by stirring for 15 seconds, iii) draining the stock while automatically recording the drainage time.

The cationic polymers tested in this Example were P1 and Ref. 1 according to in Example 1. The anionic microparticulate material used in this Example was a sol of silica-based particles of the type disclosed in U.S. Pat. No. 5,368,833. The sol had an S-value of about 25% and contained silica particles with a specific surface area of about 900 m²/g which were surface-modified with aluminium to a degree of 5%. The silica-based sol was added to the stock in an amount of 1.5 kg/ton, calculated as SiO$_2$ and based on dry stock system.

Table 1 shows the drainage time and retention values at various dosages of P1 and Ref. 1, calculated as dry polymer on dry stock system (kg/ton).

TABLE 1

| Cationic Polymer | Dewatering time (sec)/ Turbidity (NTU) at indicated Polymer dosage | | | |
|---|---|---|---|---|
| | 0.5 kg/t | 1.0 kg/t | 1.5 kg/t | 2.0 kg/t |
| P1 | 11.6/48 | 8.9/34 | 5.8/32 | 4.7/14 |
| Ref. 1 | 12.0/57 | 9.0/49 | 6.5/36 | 5.1/28 |

EXAMPLE 3

In this test series, dewatering and retention performance was evaluated according to the procedure described in Example 2.

The furnish was the same as used in Example 2. Stock volume was 800 ml, pH about 7 and conductivity was adjusted to 7.0 mS/cm by addition of calcium chloride (1300 ppm Ca), thus simulating a high electrolyte content and a high degree of white water closure.

The anionic inorganic material according to Example 2 were similarly used in this Example and was added in an amount of 1.5 kg/ton, calculated as SiO$_2$ and based on dry stock system.

The polymers used in this Example were P1, P2 and Ref. 1 according to Example 1. Table 2 shows the dewatering and retention effect at various dosages of P1, P2 and Ref. 1, calculated as dry polymer on dry stock system.

TABLE 2

| Cationic Polymer | Dewatering time (sec)/ Turbidity (NTU) at Polymer dosage of | | | |
|---|---|---|---|---|
| | 0.5 kg/t | 1.0 kg/t | 1.5 kg/t | 2.0 kg/t |
| P1 | 11.0/— | 8.7/49 | 6.3/40 | 6.0/38 |
| P2 | 10.7/— | 7.9/50 | 6.1/43 | 5.5/32 |
| Ref. 1 | 12.1/— | 9.5/57 | 8.8/47 | 7.8/43 |

EXAMPLE 4

In this test series, dewatering and retention performance was evaluated according to the procedure described in Example 2.

The stock used in this Example was similar to the stock used according to Example 3 and had a conductivity of about 7.0 mS/cm (1300 ppm Ca). The anionic inorganic material according to Example 2 was added in an amount of 1.5 kg/ton, calculated as SiO$_2$ and based on dry stock system. The polymers used were P3 and Ref. 1 according to Example 1.

Table 3 shows the results of the dewatering tests at various dosages of P3 and Ref. 1, calculated as dry polymer on dry stock system.

TABLE 3

| Cationic Polymer | Dewatering time (sec) at Polymer dosage of | | | |
|---|---|---|---|---|
| | 0.5 kg/t | 1.0 kg/t | 1.5 kg/t | 2.0 kg/t |
| P3 | 13.2 | 10.0 | 7.4 | 5.6 |
| Ref. 1 | 15.5 | 12.1 | 10.6 | 10.2 |

EXAMPLE 5

In this test series, the dewatering performance was evaluated according to the procedure described in Example 2.

The stock used in this test series was similar to the one according to Example 2 and had a conductivity of about 2.5 mS/cm. The polymers used were P4, P5 and Ref. 2 according to Example 1 which were added in an amount of 2 kg/ton, calculated as dry polymer on dry stock system. The anionic inorganic material according to Example 2 was similarly used in this test series.

Table 4 shows the results of the dewatering tests at various dosages of anionic inorganic material, calculated as $SiO_2$ and based on dry stock system.

TABLE 4

| Cationic Polymer | Dewatering time (sec) at $SiO_2$ dosage of | | | |
|---|---|---|---|---|
| | 0.5 kg/t | 1.0 kg/t | 1.5 kg/t | 2.0 kg/t |
| P4 | 11.3 | 10.1 | 9.8 | 9.1 |
| P5 | 11.8 | 9.5 | 8.8 | 8.5 |
| Ref. 2 | 11.9 | 10.7 | 10.3 | 9.9 |

EXAMPLE 6

In this test series, dewatering and retention performance was evaluated according to the procedure described in Example 2.

The furnish was the same as used in Example 2. Stock volume was 800 ml and pH about 7. Sodium chloride (550 ppm Na) and calcium chloride were added to the stock to adjusted the conductivity to 5.0 mS/cm (400 ppm Ca) and 7.0 mS/cm (1300 ppm Ca).

The polymers P2, P3, Ref. 1 and anionic microparticles according to Example 1 were similarly used in this test series in conjunction with a low molecular weight cationic polyamine. The polyamine was added to the stock followed by stirring for 30 seconds before addition of the cationic acrylamide-based polymer. The polyamine was added in an amount of 3 kg/ton, calculated as dry polymer on dry stock system. The main polymers P2, P3 and Ref. 1 were added in an amount of 1.5 kg/ton, calculated as dry polymer on dry stock system.

Table 5 shows the dewatering and retention effect at various conductivities and dosages of silica-based particles, calculated as $SiO_2$ and based on dry stock system.

TABLE 5

| Test Series | $SiO_2$ Dosage | Conductivity | Dewatering time (sec)/Turbidity (NTU) by using the indicated Cationic Polymer | | |
|---|---|---|---|---|---|
| No. | (kg/t) | (mS/cm) | P2 | P3 | Ref. 1 |
| 1 | 1.5 | 5.0 | 6.9/— | —/39 | 7.2/51 |
| 2 | 1.5 | 7.0 | 16.2/— | —/56 | 24.7/60 |
| 3 | 1.0 | 7.0 | 7.8/— | —/50 | 13.3/55 |

EXAMPLE 7

In this test series, dewatering and retention performance was evaluated according to the procedure described in Example 2.

The furnish was the same as used in Example 2. Stock volume was 800 ml and pH about 7. Varying amounts of sodium chloride was added to the stock to adjust the conductivity to 2.5 mS/cm (550 ppm Na) (Test Series Nos. 1–3), 5.0 mS/cm (1470 ppm Na) (Test Series Nos. 4–6) and 10.0 mS/cm (3320 ppm Na) (Test Series Nos. 7–9).

The cationic polymers used were P1 to P3 and Ref. 1 according to Example 1. The anionic microparticulate material used was hydrated suspension of powdered Na-bentonite in water.

Table 6 shows the dewatering and retention effect at various dosages of cationic polymer, calculated as dry polymer on dry stock system, and bentonite, calculated as dry on dry stock system.

TABLE 6

| Test Series No. | Polymer Dosage (kg/t) | Bentonite Dosage (kg/t) | Dewatering time (sec)/Turbidity (NTU) by using the indicated Cationic Polymer | | | |
|---|---|---|---|---|---|---|
| | | | P1 | P2 | P3 | Ref. 1 |
| 1 | 2 | 4 | 6.6/25 | 8.5/– | 7.5/– | 8.9/39 |
| 2 | 2 | 8 | 6.3/29 | 7.9/– | 7.2/– | 8.3/37 |
| 3 | 4 | 8 | 4.2/10 | 4.6/– | 4.9/– | 8.4/15 |
| 4 | 2 | 4 | 7.0/30 | 8.4/– | 8.9/– | 8.8/42 |
| 5 | 2 | 8 | 6.6/28 | 8.0/– | 8.4/– | 8.6/40 |
| 6 | 4 | 8 | 4.8/10 | 5.0/– | 4.8/– | 6.6/28 |
| 7 | 2 | 4 | 7.9/22 | 8.0/– | 8.2/– | 9.1/45 |
| 8 | 2 | 8 | 7.4/30 | 7.2/– | 7.1/– | 8.2/48 |
| 9 | 2 | 8 | 5.2/11 | 4.8/– | 5.2/– | 7.5/28 |

The invention claimed is:

1. A cationic vinyl addition polymer comprising in polymerized form
   (a) at least one non-ionic monomer having a non-aromatic hydrophobic monomer;
   (b) at least one cationic monomer; and
   (c) (meth)acrylamide;
wherein the cationic vinyl addition polymer is prepared from a monomer mixture comprising from 75 to 95 mole % of (meth)acrylamide;
   (a) said at least one non-ionic monomer having a non-aromatic hydrophobic group comprises an acrylamide-based monomer selected from the group consisting of N-n-propyl(meth)acrylamide and N-isopropyl(meth)acrylamide;
   (b) said at least one cationic monomer comprises a cationic monomer selected from the group consisting of:
      (i) cationic monomers represented by the general formula (I):

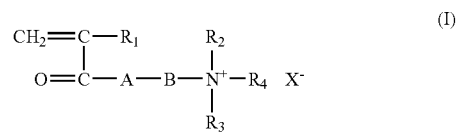

wherein $R_1$ is H or $CH_3$; $R_2$ and $R_3$ are each H or an alkyl group having from 1 to 3 carbon atoms; A is O or NH; B is an alkylene group of from 2 to 4 carbon atoms or a hydroxy propylene group; $R_4$ is a non-aromatic hydrocarbon group containing from 4 to 8 carbon atoms; and $X^-$ is an anionic counterion;

(ii) cationic monomers represented by the general formula (III):

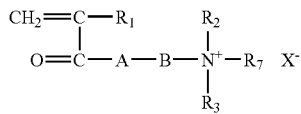 (III)

wherein $R_1$ is H or $CH_3$; $R_2$ and $R_3$ are each H or an alkyl group having from 1 to 3 carbon atoms; A is O or NH; B is an alkylene group of from 2 to 4 carbon atoms, or a hydroxy propylene group; $R_7$ is H, an alkyl group having from 1 to 3 carbon atoms, a benzyl group or a phenylethyl group; and X is an anionic counterion;

(iii) and mixtures thereof.

2. The cationic vinyl addition polymer of claim 1, wherein the (meth)acrylamide is acrylamide.

3. The cationic vinyl addition polymer of claim 1, wherein the cationic vinyl addition polymer comprises in polymerized form a cationic monomer represented by the general formula (I):

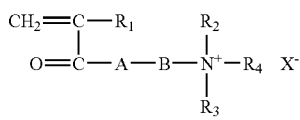 (I)

wherein $R_1$ is H or $CK_3$; $R_2$ and $R_3$ are each H or an alkyl group having from 1 to 3 carbon atoms; A is O or NH; B is an alkylene group of from 2 to 4 carbon atoms or a hydroxy propylene group; $R_4$ is a non-aromatic hydrocarbon group containing from 4 to 8 carbon atoms; and $X^-$ is an anionic counterion.

4. The cationic vinyl addition polymer of claim 1, wherein the cationic vinyl addition polymer is prepared from a monomer mixture comprising from 5 to 25 mole % of non-ionic monomer having a non-aromatic hydrophobic group, and from 95 to 75 mole % of at least one cationic monomer and (meth)acrylamide.

5. The cationic vinyl addition polymer of claim 1, wherein the cationic vinyl addition polymer comprises in polymerized form a cationic monomer represented by the general formula (I):

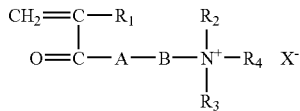 (I)

wherein $R_1$ is H or $CH_3$; $R_2$ and $R_3$ are each H or an alkyl group having from 1 to 3 carbon atoms; A is O or NH; B is a hydroxy propylene group; $R_4$ is a non-aromatic hydrocarbon group containing from 4 to 8 carbon atoms; and $X^-$ is an anionic counterion.

6. The cationic vinyl addition polymer of claim 1, wherein the cationic vinyl addition polymer comprises in polymerized form a cationic monomer represented by the general formula (III):

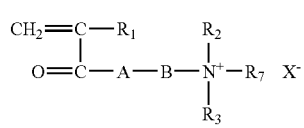 (III)

wherein $R_1$ is H or $CH_3$; $R_2$ and $R_3$ are each H or an alkyl group having from 1 to 3 carbon atoms; A is O or NH; B is a hydroxy propylene group; $R_7$ is H, an alkyl group having from 1 to 3 carbon atoms, a benzyl group or a phenylethyl group; and X is an anionic counterion.

7. A process for the production of paper which comprises:
(i) providing a suspension containing cellulosic fibres, and optional fillers;
(ii) adding to the suspension drainage and retention aids comprising an anionic microparticulate material and the cationic vinyl addition polymer of claim 1;
(iii) forming and dewatering the obtained suspension on a wire.

8. The process of claim 7, wherein the anionic microparticulate material is selected from the group consisting of silica-based particles, bentonite and mixtures thereof.

9. The process of claim 7, wherein the anionic microparticulate material is selected from silica-based particles having a specific surface area of at least 50 $m^2/g$.

10. The process of claim 7, wherein the drainage and retention aids further comprise a low molecular weight cationic organic polymer.

11. The process of claim 10, wherein the low molecular weight cationic organic polymer has a molecular weight up to 700.000.

12. The process of claim 7, wherein the suspension that is dewatered on the wire has a conductivity of at least 2.0 mS/cm.

13. The process of claim 12, wherein the conductivity is at least 3.5 mS/cm.

14. The process of claim 7, wherein the process further comprises dewatering the suspension on a wire to obtain a wet web of paper and white water, recirculating white water and optionally introducing fresh water to form a suspension containing cellulosic fibres, and optional fillers, to be dewatered, wherein the amount of fresh water introduced is less than 30 tons per ton of dry paper produced.

15. The process of claim 14, wherein less than 10 tons of fresh water is introduced into the process per ton of dry paper produced.

* * * * *

UNITED STATES PATENT AND TRADEMARK OFFICE
CERTIFICATE OF CORRECTION

PATENT NO.       : 7,306,700 B1
APPLICATION NO.  : 09/674201
DATED            : December 11, 2007
INVENTOR(S)      : Hans Hällström et al.

It is certified that error appears in the above-identified patent and that said Letters Patent is hereby corrected as shown below:

Claim 1, column 15, line 17

"and X is an anionic"                should read

--and $X^-$ is an anionic--          (change "X" to "$X^-$")

Claim 3, column 15 line 33

"H or $CK_3$; $R_2$ and $R_3$"       should read

--H or $CH_3$; $R_2$ and $R_3$--     (the "K" should be an "H")

Claim 6, column 16, line 21

"and X is an anionic"                should read

--and $X^-$ is an anionic--          (change "X" to "$X^-$")

Claim 11, column 16, line 41

"700.000"                            should read

--700,000--                          (change the period to a comma)

Signed and Sealed this

Twenty-eighth Day of April, 2009

JOHN DOLL
*Acting Director of the United States Patent and Trademark Office*